United States Patent
Duchemin et al.

(10) Patent No.: US 8,002,105 B2
(45) Date of Patent: Aug. 23, 2011

(54) ARRANGEMENT FOR GROUPING INTO ROWS THE PRODUCTS OF A BATCH ON A HIGH SPEED CONVEYOR BELT

(75) Inventors: Guillaume Duchemin, Octeville sur Mer (FR); Christophe Poupon, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 290 days.

(21) Appl. No.: 12/376,502

(22) PCT Filed: Aug. 9, 2007

(86) PCT No.: PCT/EP2007/058279
§ 371 (c)(1),
(2), (4) Date: Feb. 5, 2009

(87) PCT Pub. No.: WO2008/022930
PCT Pub. Date: Feb. 28, 2008

(65) Prior Publication Data
US 2010/0163368 A1    Jul. 1, 2010

(30) Foreign Application Priority Data

Aug. 24, 2006   (FR) .................................. 06 53446

(51) Int. Cl.
*B65G 47/26* (2006.01)
(52) U.S. Cl. ............... 198/419.3; 198/419.2; 198/459.8; 198/579
(58) Field of Classification Search ............... 198/419.2, 198/419.3, 459.8, 161.1, 575, 578, 579
See application file for complete search history.

(56) References Cited

U.S. PATENT DOCUMENTS

| | | | | |
|---|---|---|---|---|
| 3,178,007 A | * | 4/1965 | Standley et al. | 198/419.3 |
| 3,194,382 A | * | 7/1965 | Nigrelli et al. | 198/418.1 |
| 3,872,647 A | * | 3/1975 | Langen et al. | 53/157 |
| 4,443,995 A | * | 4/1984 | Myers et al. | 53/443 |
| 4,892,181 A | | 1/1990 | Hogenkamp | |
| 5,101,957 A | * | 4/1992 | Schiek | 198/419.1 |
| 5,147,027 A | * | 9/1992 | Cruver | 198/419.3 |
| 5,667,055 A | * | 9/1997 | Gambetti | 198/419.3 |
| 6,766,628 B2 | * | 7/2004 | Guidetti | 53/443 |
| 6,843,360 B2 | * | 1/2005 | Peterman et al. | 198/429 |
| 7,665,598 B2 | * | 2/2010 | Begin et al. | 198/419.3 |
| 7,681,712 B2 | * | 3/2010 | Hara et al. | 198/461.1 |
| 7,752,828 B2 | * | 7/2010 | Gudim et al. | 53/534 |

FOREIGN PATENT DOCUMENTS

EP    0452560    10/1991

OTHER PUBLICATIONS

International Search Report dated Nov. 28, 2007, in PCT application.

* cited by examiner

*Primary Examiner* — Douglas A Hess
(74) *Attorney, Agent, or Firm* — Young & Thompson

(57) ABSTRACT

In an arrangement (10) for grouping a plurality of products (Pn, Pn+1) into batches (Li) carried by at least one conveyor belt (12) travelling in a longitudinal direction at a travelling speed (V1), the products (Pn, Pn+1) arrive with at least one determined upstream spacing (E) between two successive products, and including an advanced phaser (22, 23) provided on the path of the products (Pn, Pn+1) and capable of grouping transversally at least two products (Pn, Pn+1) into a row so as to form, at high speed, batches (Li) obtained by grouping the products (Pn, Pn+1).

20 Claims, 6 Drawing Sheets

ARRANGEMENT FOR GROUPING INTO ROWS THE PRODUCTS OF A BATCH ON A HIGH SPEED CONVEYOR BELT

BACKGROUND OF THE INVENTION

The invention relates to an arrangement for the grouping into rows of products of a batch, particularly on a high-speed conveyor belt.

More particularly, the invention relates to an arrangement for the grouping of several products in the form of batches, wherein the products are transported on at least one conveyor belt which runs in a longitudinal direction from an upstream entrance zone to a downstream exit zone, at a determined speed called the traveling speed, wherein the products are placed longitudinally on the conveyor belt in at least one first line of products and one second line of products parallel to the first line and comprising respectively products which, from one line to the other line, are offset longitudinally from one another by at least one upstream spacing, and comprising phasing means which, arranged on the path of the products between the entrance zone and the exit zone, are capable of forming batches made up by the grouping of at least two products and in a transverse row, the phasing means comprising at least one phaser which comprises at least one stop operated successively between:
  at least one engaged position in which the stop is interposed, by contact, in front of a product of one of the lines for the purpose of decelerating it until it is joined by at least one other product situated immediately upstream on the other of the lines, and
  at least one retracted position which makes it possible to let the previously-formed batch to continue its movement downstream at the traveling speed.

This type of arrangement is used in installations for the packaging of products, for example in installations comprising a conveyor line which transports the products from a boxing machine, the boxing machine stacking the batches of products into packaging boxes or cartons.

The conveyor line usually comprises, upstream of the boxing machine, a conveyor belt which transports the products on one or more lines, with a determined spacing between two consecutive products, up to a grouper comprising a series of movable transport cavities.

The grouper has, facing the conveyor belt, at least one empty cavity provided to receive a determined number of products which are stacked in the cavity in order to form a batch.

When a batch is made up in the cavity, the latter is moved one notch in order to allow the grouper to present a new empty cavity facing the conveyor belt.

The cavities are therefore offset progressively, usually notch by notch, which makes it possible to transport the batches of products up to the boxing machine.

To facilitate and accelerate the filling of the cavities, it is known practice to make up the batches of products upstream of the grouper, by means of a device comprising means for phasing the products, also called a "phaser".

According to a first solution, it is known practice to produce such a phaser by means of several successive conveyor belts, called rate-regulator conveyor belts, which operate at different traveling speeds.

In this type of phaser, the products arrive placed in lines, via a first conveyor belt, on an acceleration upstream conveyor belt operating at a traveling speed greater than that of the first conveyor belt.

The upstream conveyor belt transports the products to an intermediate deceleration conveyor belt.

The products are held down and retained on the intermediate conveyor belt by means of a lower suction device.

The intermediate conveyor belt progressively offsets each product forward until a rowed batch comprising at least two products grouped one beside the other is made up on the intermediate conveyor belt.

When the batch of products is made up, the traveling speed of the intermediate conveyor belt increases so as to transfer the batch to a downstream conveyor belt which operates at a traveling speed similar to that of the upstream conveyor belt.

The acceleration of the batch of products when it is transferred from the intermediate conveyor belt to the downstream conveyor belt limits the overall speed because, as it is too high, it then causes a movement of one or more products that is likely to disorganize the batch.

This type of phaser is also unsatisfactory because it requires the use of several conveyor belts placed end-to-end, which is particularly detrimental to the longitudinal space requirement of the installation.

The regulation of the speed of the various conveyor belts and the length of these conveyor belts are consequently calculated for a determined type of products and of batches so that it is necessary to develop a new phaser when the length of the products or the number of products per batch is for example modified.

In addition, the suction device does not work for certain types of products, which limits the scope of application of this phaser.

By its design, a phaser according to this first solution therefore does not allow the processing of products at very high speed.

According to a second solution, for example from document U.S. Pat. No. 4,892,181, an arrangement is known for the grouping of several products into rows.

In this document, the phasing means are in particular suitable for decelerating one or more products transported on a conveyor belt so as to form a transverse row from at least two products belonging to two lines that are parallel and initially offset longitudinally from one another.

However, the phasing means according to this document are not suitable for placing in rows products comprising only a reduced upstream spacing because the decelerating distance is very short.

Therefore, it is not possible to carry out a treatment of products at very high speed, particularly at speeds of more than 900 products per minute.

This is one of the reasons for which the applicant has proposed in French patent application No 0550528 lined on 28 Feb. 2005 (not published), a new phaser design constituting a solution that is simple, economic and effective that makes it possible to remedy the disadvantages of the phasing means according to the prior art.

This application No 0550528 relates to an arrangement like that described above, comprising a phaser which is arranged between the entrance zone and the exit zone of a conveyor belt to carry out the grouping "in columns" of products so as to make up batches from several products traveling in a single longitudinal line with a determined upstream spacing.

For this reason, the phaser comprises at least one retractable stop that is capable of being operated respectively between:
  at least one engaged position in which the stop is interposed, by contact, in front of a first product of the line in order to decelerate it until this first product is joined by at least one second product which is situated immediately upstream in the line of products, in order to make up a first batch formed of the grouping into a column of two products aligned longitudinally one behind the other.

at least one retracted position which makes it possible to let the previously constituted batch continue its movement downstream at the traveling speed.

According to the teachings of this document, such a phaser is used to make up a succession of batches that are each formed of at least two products grouped longitudinally one behind the other, that is to say of products aligned so as to form a column extending in the longitudinal direction of conveyance.

However, the make-up of such batches called "in a column" is not suitable for all applications, for example when the boxing machine stacks the batches of products into packaging boxes or cartons in a different orientation or else when the orientation is imposed by the shape of the product.

Therefore, by opposition to the batches of products grouped longitudinally "in a column", there are batches of products grouped "in a row" that are made up of products grouped transversely one beside the other, that is to say placed head-on substantially on one and the same line.

Specifically, the rowed groupings of the products of the batches are for example preferred when the products have an oblong shape, longer than they are wide, and when they are also oriented on the conveyor belt in the lengthwise direction in the longitudinal direction of travel from upstream to downstream.

SUMMARY OF THE INVENTION

The object of the invention is notably to remedy the disadvantages of the prior art by proposing a simple, economic and effective solution and more particularly making it possible to make up at very high speed batches of products grouped into rows.

For this purpose, the invention proposes an arrangement of the type described above, characterized in that the phaser comprises at least one drive belt which supports at least the stop and which is arranged on the side of the upper face of the conveyor belt, in that the drive belt is wound onto at least two drive pulleys so that a lower strand of the drive belt extends substantially parallel to the upper face of the conveyor belt, the stop occupying engaged positions when it is situated on the lower strand, and in that the phaser comprises means for rotating the pulleys so that the longitudinal speed for driving the stop downstream by the drive belt in the engaged position is equal to a determined speed called the decelerated speed, less than the traveling speed, in order to transversely align the products in a row to form the batch.

Advantageously, the phaser is operated selectively so that its operation is independent of any differences or fluctuations in the values of the upstream spacings between the products.

According to other features of the invention:

the stop is operated from its engaged position to its retracted position when the spacing between the two products of the batch reaches a substantially zero determined value;

the drive belt comprises a passive operating state in which it is stopped, each stop occupying a retracted standby position, and an active operating state in which the drive belt is rotated about the pulleys so that a stop moves longitudinally downstream in the engaged position, and, for each batch to be formed, the drive belt is operated into its active state when a determined product, such as the first product, is detected by a sensor, upstream of the phaser;

the phaser comprises a first drive belt and a second drive belt that are similar and that are arranged in parallel and that are driven independently, and in that each drive belt is operated into its active state before the end of the active state of the other drive belt, so that the make-up of a new batch begins before the preceding downstream batch has been released;

when the two drive belts are in the passive state, the standby positions of the stops of the first drive belt are offset relative to the standby positions of the stops of the second drive belt, so as to prevent the stops of the two drive belts from crossing;

each drive belt supports at least two similar stops that are evenly spaced along the drive belt so that, for each drive belt, only one stop at a time can occupy an engaged position;

the arrangement comprises a grouping device with cavities which is arranged at the exit of the conveyor belt, each cavity being provided to contain a batch of products and to transport this batch to a downstream processing station;

the arrangement comprises an ejection device comprising means, such as a jet of compressed air, which are arranged upstream and/or downstream of the phaser.

BRIEF DESCRIPTION OF THE DRAWINGS

Other features and advantages of the invention will appear on reading the following detailed description for the understanding of which reference should be made to the appended drawings in which.

DETAILED DESCRIPTION OF THE PREFERRED EMBODIMENTS

To describe the invention, the vertical, longitudinal and transverse orientations will be adopted in a nonlimiting manner to make it easier to understand, according to the V, L, T coordinate system indicated in the figures.

In the following description, identical, similar or analogous elements will be designated by the same reference numbers.

Figure 1A:
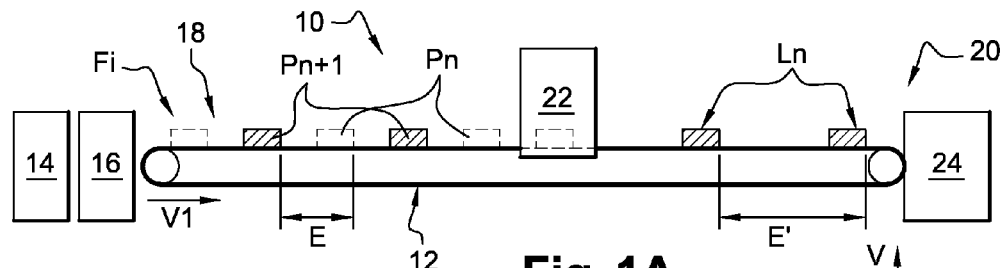
FIGS. 1A and 1B are respectively a side view and a top view which represent schematically an arrangement according to a first embodiment of the invention comprising a phaser arranged above a conveyor belt.
Figure 1B:
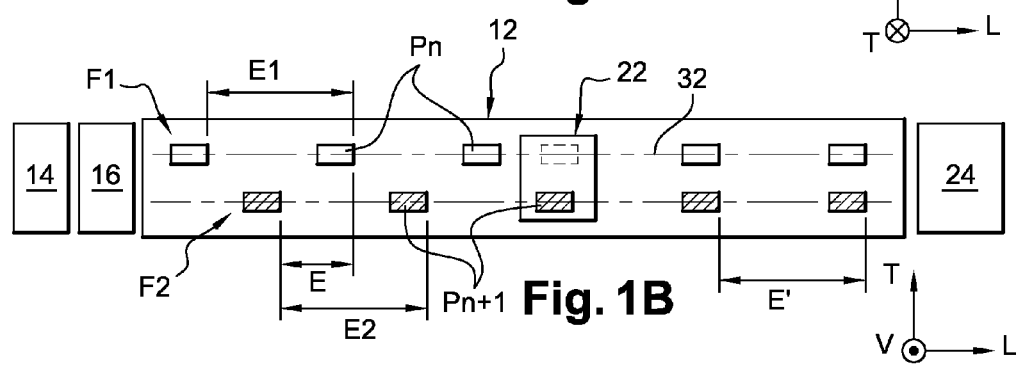

FIGS. 1A and 1B represent schematically an arrangement 10 for the grouping into rows of products Pn, Pn+1 in the form of batches Li.

The arrangement 10 comprises a conveyor belt 12 which travels in a longitudinal direction oriented from upstream to downstream, which corresponds to a general orientation from left to right in FIGS. 1 to 12.

The arrangement 10 comprises a feeding device 14, such as a conveyor belt, which is designed to feed the conveyor belt 12 with products Pn, Pn+1.

Advantageously, the arrangement 10 comprises a distribution device 16 capable of distributing the products Pn, Pn+1 over the surface of the conveyor belt 12 with a determined distribution sequence, the means (not shown) of the distribution device 16 preferably being incorporated into the feeder device 14.

The conveyor belt 12 transports the products Pn, Pn+1 from an entrance zone 18 situated upstream to an exit zone 20 situated downstream.

The conveyor belt 12 has a substantially constant traveling speed V1 at which both the products Pn and the products Pn+1 that are placed on the upper horizontal surface of the conveyor belt 12 are carried along.

As represented in FIG. 1B, the products Pn, Pn+1 are placed on the upper surface of the conveyor belt 12 in at least two longitudinal lines, respectively a first line F1 and a second line F2, which are generally parallel with one another and out of phase relative to one another, that is to say whereof the products Pn, Pn+1 are offset longitudinally from one another from one line to the other.

In the figures, the products Pn+1 of the second line F2 have been hatched in order to allow them to be differentiated from the products Pn of the first line F1.

However, the products Pn and the products Pn+1, here represented schematically by parallelepipedal boxes are preferably identical products which therefore differ only in the lines Fi to which they belong.

By definition, a "spacing" corresponds in the rest of the present description to the longitudinal distance between the downstream end of a first product Pn or Pn+1 belonging in this instance respectively to a given first line F1 or second line F2 and the downstream end of a second product Pn or Pn+1 situated immediately upstream of the first product Pn, Pn+1 belonging either to the same line F1, F2, or to the other line parallel to that comprising the first product Pn or Pn+1.

Consequently, the spacing (or pitch) corresponds in this instance to the distance between each vertical downstream face of a parallelepipedal box corresponding to a product Pn of the first line F1 and/or to a product Pn+1 of the second line F2.

By definition, a "product" Pn or Pn+1 within the meaning of the invention does not necessarily consist only of a single product but may also consist of a set of several products, notably a batch of products, the set being defined relative to a phaser 22 or to the grouping device 24.

By definition, the index "n" is here an odd number greater than or equal to one so that the first line F1, called the odd line, consists of products P1, P3, P5 ... Pn while the second line F2, called the even line, consists of the products P2, P4, P6 ... Pn+1, the products Pn, Pn+1 being respectively intended to be grouped into a row each corresponding to a batch Li.

A batch Li is therefore formed when the batch comprises a grouping consisting of at least one product Pn and one product Pn+1 which are aligned side by side, in order to form a row (or a rank), oriented here in a transverse direction, that is to say at right angles to the longitudinal direction of conveyance.

Consequently, for batches Li comprising for example two products, the batch L1 consists of the rowed grouping of the products P1 and P2, the batch L2 consisting of the rowed grouping of the products P3 and P4, etc.

Phasing means comprising at least one phaser 22, according to the teachings of the invention, are arranged on the path of the products Pn, Pn+1, between the entrance zone 18 and the exit zone 20, so as to form said batches Li successively.

The arrangement 10 comprises a phaser 22 which is positioned vertically above the conveyor belt 12.

Preferably, the phaser 22 is centered on the conveyor belt 12 relative to the first line F1 and to the second line F2 so as to be capable of acting respectively on the products Pn and Pn+1 that each of the lines F1, F2 contains.

Advantageously, the phaser 22 is mounted so as to be able to move transversely so as to make it possible to adjust the position thereof depending notably on the transverse distance or spacing between the first line F1 of products Pn and the second line F2 of products Pn+1.

Advantageously, the odd products Pn arrive, upstream of the phaser 22, in the first line F1 with an upstream spacing E1 between each of the products Pn.

In the same manner, the even products Pn+1 arrive, upstream of the phaser 22, in the second line F2 with an upstream spacing E2 between each of the products Pn+1.

Preferably, the upstream spacing E1 between two successive products Pn and the downstream spacing E2 between two successive products Pn+1 are constant and correspond respectively to a minimum set point value.

The products Pn and the products Pn+1 are offset in the longitudinal direction, that is to say out of phase relative to one another from one line F1 to the other line F2 by a determined upstream spacing E corresponding at least to a minimum set point value.

In the example represented to illustrate the invention in FIGS. 1A and 1B, spacing values E1 and E2 have been chosen in a nonlimiting manner to be substantially identical, in order notably to make it easier to understand the operating principle of the phaser 22 according to the invention.

In addition, each of the products Pn or Pn+1 is positioned from one line F1 to the other F2 in a particular determined distribution sequence, in this instance a zigzag distribution with an alternation of one product out of two.

Therefore, each of the products Pn forming the first line F1 is offset longitudinally by an upstream spacing E relative to the product Pn+1 of the second line F2 which follows directly therefrom.

The offset between the products Pn and Pn+1 of each of the lines F1 and F2 therefore corresponds to an alternate distribution in a zigzag so that, upstream of the phaser 22, the product P2 of the second line F2 is substantially at an equal distance from the product P1 situated in the first line F1 and from the product P3 situated in the same line F2, that is to say respectively from the nearest products Pn and Pn+1, one downstream preceding it in the first line F1 and the other upstream following it in the second line F2 in the direction of travel of the conveyor belt 12.

Naturally, the distribution sequence of the embodiments shown is given only as a nonlimiting example and, as a variant, the values of the upstream spacings E1, E2 and E may be different.

Advantageously, the phaser 22 is capable, for each application, of being adapted to the distribution sequence determined according to which the products Pn and Pn+1 arrive in the entrance zone 18, or else of producing downstream of the phaser 22 other types of batch Li from products Pn and Pn+1 distributed transversely on the conveyor belt 12 in at least two distinct lines Fi.

In the embodiments represented to illustrate the invention, the phaser 22 is designed to form batches Li of the "rowed" type comprising two products Pn and Pn+1 grouped transversely side by side.

The batches Li formed then exit the phaser 22 with a downstream spacing E' between two successive batches Li.

In a known manner, the batches Li are for example collected, in the exit zone 20, by a grouping device, called a grouper 24, which transfers the batches Li to a processing station (not shown) downstream, such as a boxing machine.

Advantageously, the phaser 22 comprises at least one retractable stop 26, 28 which is operated successively between:
- at least one engaged position in which the stop 26, 28 is interposed, by contact, in front of a product Pn of one F1 of the lines F1, F2 in order to decelerate it until it is joined by at least one other product Pn+1 situated immediately upstream on the other F2 of the lines, in order to form a batch Li made up of products Pn and Pn+1 grouped side by side into a transverse row,
- at least one retracted position which makes it possible to let the previously-formed batch Li continue its movement downstream at the speed V1 of travel.

Advantageously, the phaser 22 therefore comprises at least one retractable stop 26, 28 which is capable of decelerating one Pn of the products Pn, Pn+1 so that said product Pn is caught up by the next product Pn+1 in order to form, when they have joined up, a batch Li made up of at least two products Pn and Pn+1 placed in a row side by side in each of the lines F1 and F2.

A first embodiment of the invention comprising a phaser 22 is schematized in FIGS. 2A to 5B.

The phaser 22 comprises a drive belt 30 which is arranged on the side of the upper face 32 of the conveyor belt 12 and which is capable of moving at least one stop.

Preferably, the drive belt 30 in this instance comprises two stops 26, 28, as a variant three stops or more depending on the applications.

The drive belt 30 is wound onto an upstream pulley 34 and onto a downstream pulley 36 with axes A1, A2 that are transverse to the longitudinal direction.

The two pulleys 34, 36 are in this instance arranged above the conveyor belt 12 so that the lower strand 38 of the drive belt 30 extends substantially parallel to the upper face 32 of the conveyor belt 12 and so that the stops 26, 28 are substantially centered transversely relative to the lines F1 and F2 of the conveyor belt 12 and are capable of acting on the products Pn and the products Pn+1 of the lines F1 and F2.

The downstream pulley 36 is designed to be rotated by means of a servomotor 40 so as to rotate the drive belt 30 about the pulleys 34, 36 and so that the lower strand 38 moves in the same direction as the conveyor belt 12. Accordingly, the downstream pulley 36 is rotated in the anticlockwise direction, when looking at FIGS. 3A and 4A.

The drive belt 30 supports, on its outer face, a first stop 26 and a second stop 28 that are similar and that are arranged in substantially opposing positions along the drive belt 30.

The setting in motion of the drive belt 30 about the pulleys 34, 36 therefore moves the stops 26, 28.

Each stop 26, 28 is in this instance generally in the shape of a transverse plate perpendicular to the portion of the drive belt 30 that supports it.

As a variant, the shape and the materials used for the manufacture of the stops 26, 28 are capable of varying notably according to the type of product processed.

The height of the lower strand 38 of the belt 30 and/or the height of each stop 26, 28 relative to the upper face 32 of the conveyor belt 12 is such that, when a stop 26, 28 is situated on the lower strand 38, it forms an obstacle to the passage of the products Pn of the first line F1 and/or of the products Pn+1 of the second line F2, which corresponds to a position called the engaged position of the stop 26, 28.

Figure 3A:
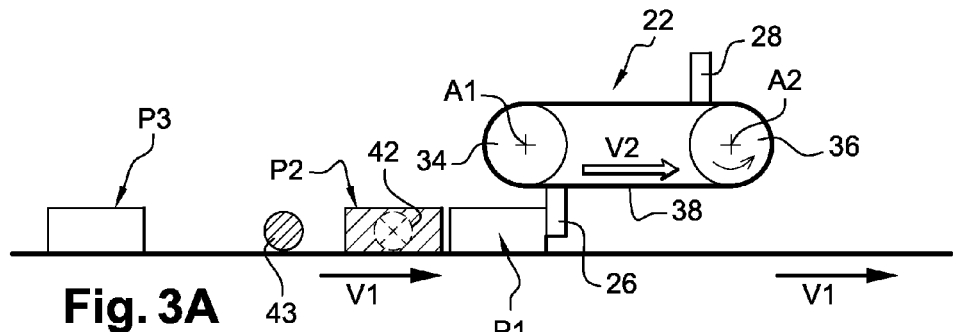
FIGS. 3A and 3B are views similar to those of FIG. 2 which represent the phaser when the drive belt is in the active state at the beginning of the engagement of a stop with a product to make up a batch of two products.
Figure 3B:
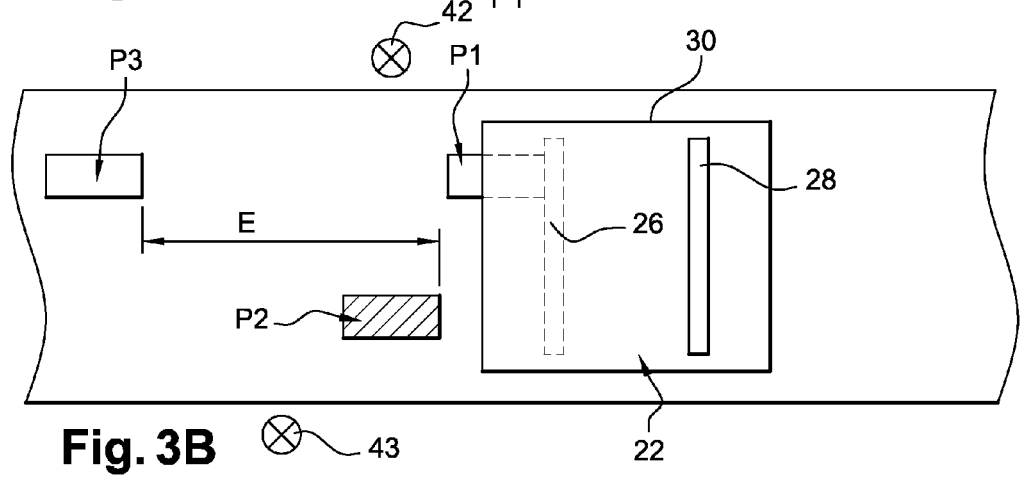
Figure 4A:
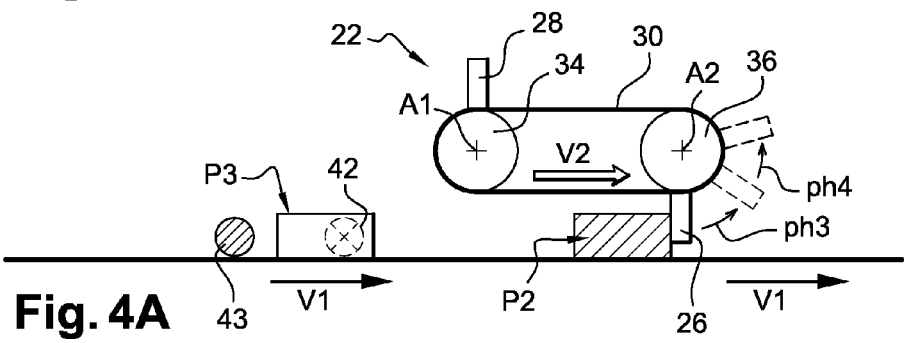
FIGS. 4A and 4B are views similar to those of FIG. 2 which represent a phaser when the drive belt is in the active state just before the batch of products is released.

When a stop 26, 28 occupies an engaged position, the opposite stop 26, 28 occupies a retracted position, which is for example the case in FIGS. 3A and 4A where the first stop 26 occupies an engaged position and where the second stop 28 occupies a retracted position.

The stops 26, 28 may also occupy intermediate positions, represented in FIGS. 3A to 5A, when they are situated on the wound portions of the drive belt 30.

Figure 2A:
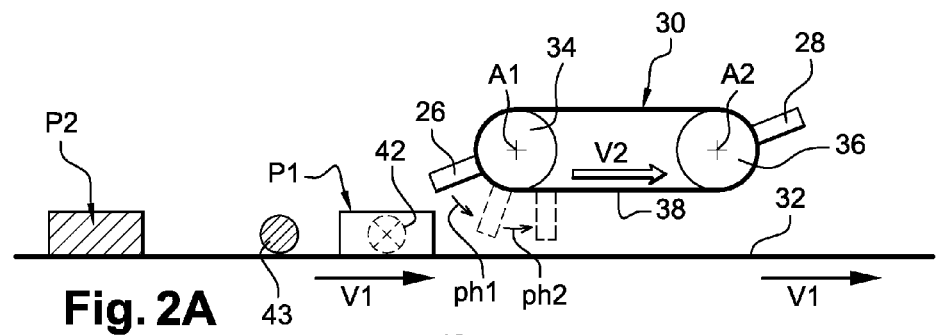
FIGS. 2A and 2B are respectively a side view and a top view which represent schematically the phaser of FIG. 1 when the drive belt is in the passive state.
Figure 2B:
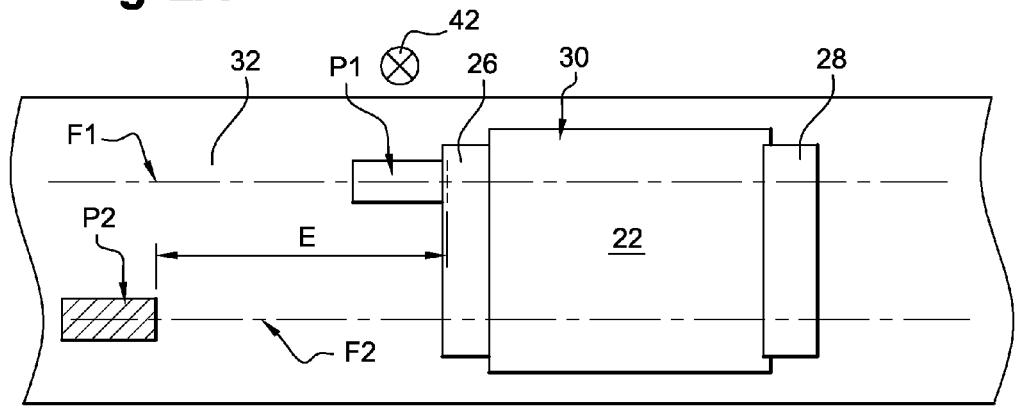

In FIG. 2A, the intermediate position occupied by the first stop 26 is called the upstream standby position and the intermediate position occupied by the second stop 28 is called the downstream standby position. These standby positions are respectively retracted positions.

In the upstream standby position, the first stop 26 is situated at the height of the upstream pulley 34. It is close to an engaged position but sufficiently inclined upstream not to hamper the passage of the products Pn of the first line F1 or of the products Pn+1 of the second line F2 underneath the lower strand 38 of the drive belt 30.

In the downstream standby position, the second stop 28 is situated at the height of the downstream pulley 36 and it can therefore not interfere or act as an obstacle when the products Pn and/or the products Pn+1 pass under the lower strand 38.

Figure 5A:
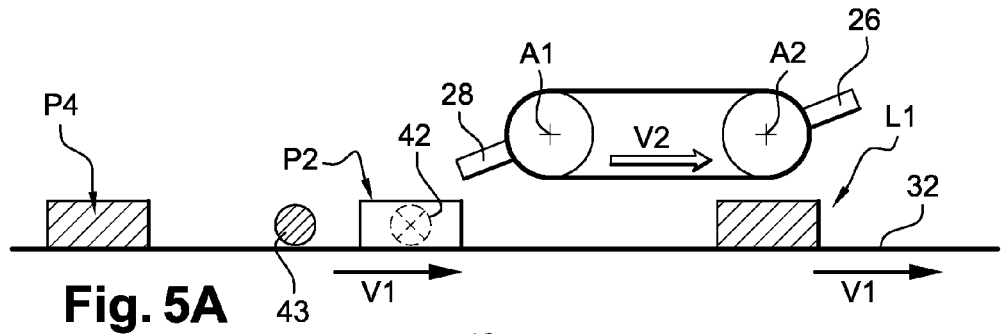
FIGS. 5A and 5B are views similar to those of FIG. 2 which represent the phaser when the drive belt is in the passive state just after the batch of products has been released and just before the engagement of a stop with a new product.
Figure 5B:
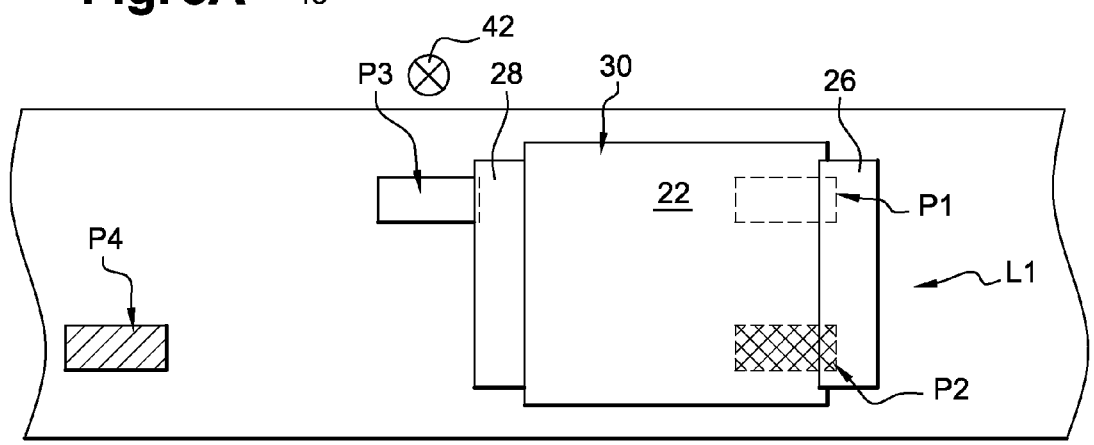

In FIG. 5A, the two stops 26, 28 occupy inverted positions relative to FIG. 2A, the second stop 28 occupying an upstream standby position and the first stop 26 occupying a downstream standby position.

According to the teachings of the invention, the drive belt 30 is operated successively into a passive state and into an active state.

In its passive state, which is illustrated by FIGS. 2A and 5A, the drive belt 30 is stopped and the stops 26, 28 occupy their standby positions.

In the active state of the drive belt 30, which is illustrated by FIGS. 3A and 4A, the servomotor 40 rotates the drive belt 30 about the pulleys 34, 36 which causes a longitudinal movement of the stops 26, 28 above the conveyor belt 12, at a speed called the decelerated speed V2 which is less than the traveling speed V1 of the conveyor belt 12.

Preferably, the decelerated speed V2 is substantially constant and corresponds to the longitudinal speed VL of movement of the stops 26, 28.

Considering FIGS. 2A to 5A, the first stop 26 moves downstream, from its upstream standby position to its downstream standby position, and the second stop 28 moves upstream, from its downstream standby position to its upstream standby position.

During the downstream movement of the first stop 26, the latter occupies engaged positions.

Advantageously, the drive belt 30 is operated into its active state and into its passive state depending on the signals transmitted by detection means 42, for example by a sensor, which are arranged between the entrance zone 18 and the phaser 22, and which are capable of detecting the arrival of a product on the conveyor belt 12.

Advantageously, the driving of the drive belt 30 and the movement of the stops 26, 28 of the phaser 22 is therefore operated selectively depending on the detection of the products thanks to which the phaser 22 works independently of the differences or fluctuations that may occur in the values of the upstream spacings E1, E2 or E3 between the products Pn and/or Pn+1.

The sensor 42 is in this instance capable of detecting preferably the products Pn of the first line F1.

As a variant, the sensor 42 is capable of detecting the products Pn of the first line F1 and/or the products Pn+1 of the second line F2, and is arranged above the surface 32 of the conveyor belt 12.

The sensor 42 consists, for example, of an electric cell which is arranged on the edge of the conveyor belt 12 adjacent to the first line F1 and which is electrically connected to the servomotor 40, so that the detection of a determined product, such as the first product P1, on the conveyor belt 12, causes the servomotor 40 to start up at the appropriate moment.

Note that the arrangement 10 according to the invention may be fitted with a coder (not shown) which measures precisely the distance traveled by the conveyor belt 12 based on a detection signal, such as that transmitted by the sensor 42 for a product Pn.

Thanks to the coder, the longitudinal position of the product Pn detected by the sensor 42, relative to the phaser 22, is known precisely, which ensures the starting of the servomotor 40 at the appropriate moment.

Advantageously, the arrangement 10 comprises, in the first embodiment, a feeder device 14 and a distribution device 16 thanks to which at least the upstream spacing E between the product P1 detected by the sensor 42 and the product P2 has a determined constant value.

Advantageously, the upstream spacing E2 has, like the spacing E, a determined constant value.

Advantageously, thanks to the sensor 42, the operation of the driving of the drive belt 30 of the phaser 22 is synchronized with the detection of product Pn, Pn+1 so that the phaser 22 is capable of processing indifferently products having a spacing value E1, E2 or E that is constant or above all variable.

This selective operating feature is particularly advantageous for allowing a reliable operation of the arrangement 10 according to the invention at high speed, for example beyond 900 products per minute.

The operating parameters of the phaser 22, in particular the decelerated speed V2, are determined according to the other parameters for each application.

Specifically, the decelerated speed V2 is determined so that, the product P1 of the first line F1 traveling the longitudinal distance, called the decelerating distance, between the upstream and downstream engaged positions of a stop 26, 28, the product P2 of the second line F2 travels simultaneously, at the traveling speed V1, a longitudinal distance corresponding to the sum of said decelerating distance and the upstream spacing E.

The decelerating distance therefore corresponds generally to the distance between the axes A1-A2 of the phaser 22 or to the length of the strand 38 of the drive belt 30 so that, in addition to the determination of the decelerated speed V2, the decelerating distance is also capable of being adjusted notably by modifying the length of the drive belt 30 with a distance between axes A1-A2 that is adjustable or the relative position of the stops 26, 28.

Preferably, the arrangement 10 comprises other detection means 43, such as at least one sensor and/or one coder, called second means, which are associated with the second line F2 and which are notably capable of detecting the arrival of a product Pn+1 of the second line F2 on the conveyor belt 12 and/or of precisely measuring the distance traveled by the conveyor belt 12 from a detection signal, such as that transmitted by a sensor 43 for a product Pn+1.

Advantageously, the first and second detection means 42, 43 are capable of detecting respectively the products Pn of the first line F1 and the products Pn+1 of the second line F2 and of determining the upstream spacing E between each of them so as to supply signals capable of being used in real time for the operation of the phaser 22.

Advantageously, it is possible to determine, by comparing the signals transmitted respectively by the detection means 42 and 43, whether the real upstream spacing value E between the product Pn of the line F1 and the product Pn+1 of the line F2 is greater than or equal to the determined set point value.

The operation of the phaser 22 according to the first embodiment will be described below in detail.

While the drive belt 30 is in a passive state in which the first stop 26 occupies its upstream standby position (FIG. 2A), the sensor 42 detects the arrival of a product P1 of the first line F1, called the first product.

The detection signal transmitted by the sensor 42 causes the start-up of the servomotor 40 so that the drive belt 30 passes from its passive state to its active state, and so that the first stop 26 passes from its upstream standby position to its engaged position, as shown in FIGS. 3A and 4A.

The first stop 26 is then driven longitudinally downstream, at the decelerated speed V2.

Since the decelerated speed V2 of the first stop 26 is less than the traveling speed V1 of the first product P1, the first product P1 joins the first stop 26 and butts against the upstream transverse face of the latter, which causes the first product P1 of the first line F1 to slide on the conveyor belt 12.

The first product P1 then moves longitudinally at the decelerated speed V2 imposed by the first stop 26, until the first stop 26 occupies a retracted position.

Note that, during the transition of the drive belt 30 from the passive state to the active state, the start-up of the servomotor 40 comprises a preliminary acceleration phase ph1, which allows the drive belt 30 to pass from a zero longitudinal drive speed VL to a stabilized longitudinal drive speed VL equal to the decelerated speed V2.

Preferably, the upstream standby position is chosen so that the first stop 26 reaches an intermediate position of engagement at the end of the acceleration phase ph1, before it reaches its first vertical engaged position.

FIG. 2A shows in a thin dashed line the intermediate engagement position and in thick dashed line the first vertical engaged position of the first stop 26.

The movement phase of the first stop 26 between the intermediate engagement position and the first vertical engaged position is called the engagement phase ph2.

The moment of start-up of the servomotor 40 is for example fixed relative to the signal of the sensor 42 so that the first product P1, arriving at the traveling speed V1, comes into contact in a synchronous manner with the first stop 26 during the engagement phase ph2.

Therefore, when the first stop 26 occupies its first vertical engaged position, the first product P1 is immobilized pressing against the first stop 26, which is illustrated by FIG. 3A.

Then, immobilized pressing against the first stop 26, the first product P1 moves longitudinally at the decelerated speed V2.

The second product P2 in this instance is made up by the first product of the second line F2, that is to say which follows directly the first product P1 relative to a fixed frame of reference, like the sensor 42, and which is situated immediately at a determined upstream spacing E from the first product P1.

Since the second product P2 of the second line F2 still moves on the conveyor belt 12 at the traveling speed V1, the upstream spacing E will progressively diminish until it reaches a zero value when it joins the first product P1 to also be immobilized pressing against the first stop 26 and consequently aligned transversely in a row with the latter.

According to the exemplary embodiment described and represented, the decelerated speed V2 and the distance between the axes A1-A2 between the two pulleys 34, 36 are therefore chosen according to the traveling speed V1 and according to the upstream spacing E between the products Pn of the first line F1 and the products Pn+1 of the second line F2.

Therefore, the second product P2 normally joins the first product P1 immediately before the first stop 26 passes from its engaged position to its retracted position, that is to say generally to the height of the downstream pulley 36, which is more particularly illustrated by FIG. 4A.

Advantageously, the tilting of the stop 26 toward its retracted position takes place therefore when, the product P2 having joined the product P1, the first rowed batch L1 is formed.

This will always be the case when the real value of the spacing E is less than or equal to the minimum set point value of the upstream spacing E.

However, this will not be the case if the real value of the spacing E is on the other hand greater than the minimum set point value of the upstream spacing E.

Specifically, the minimum set point value of the upstream spacing E therefore corresponds to a maximum value beyond which the second product P2 cannot join the first product P1 to form the batch L1.

In this case, the first product P1 is capable of being released by the tilting of the stop 26 before the products P1 and P2 have been able to be aligned transversely beside one another to form the batch L1.

This is why, when the arrangement 10 comprises a sensor 42 or 43 capable of transmitting a signal representative of the real position of the product P2, such a signal is then advantageously used to prevent the case of a positional difference between the products Pn of the first line F1 and the products Pn+1 of the second line F2 which have a value E greater than said minimum determined set point value.

Preferably, the signal of the sensor 43 is capable of being used to synchronize, with the real position of the product P2, the passage of the first stop 26 in contact with the first product P1 from its engaged position to its retracted position.

Depending on the real value of the spacing E, the driving of the drive belt 30 is operated to carry out a time delay and immobilize the stop 26 before its tilting from its engaged position to its retracted position.

It will be understood however that such a time delay can be carried out with a phaser 22 only if it is not capable of causing a malfunction such as temporarily making unavailable the second stop 28 while the next product Pn had been detected.

Nevertheless, if such a time delay is not possible, it is possible for example to proceed, downstream of the phaser 22, with the elimination of the products P1 and P2 or else proceed with the transverse alignment of the products P1 and P2 by means of another identical phaser placed downstream and operating in a similar manner, as will be illustrated below.

In the other cases, by joining the first product P1 before the tilting of the stop 26, the second product P2 then systematically forms with the latter a first batch L1, said first batch L1 being in this instance made up of only two products P1 and P2.

As a variant, the batch Li comprises more than two products; by generalizing, it will be understood that a row forming a batch Li comprises as many products side by side as there are lines Fi.

Figure 4B:
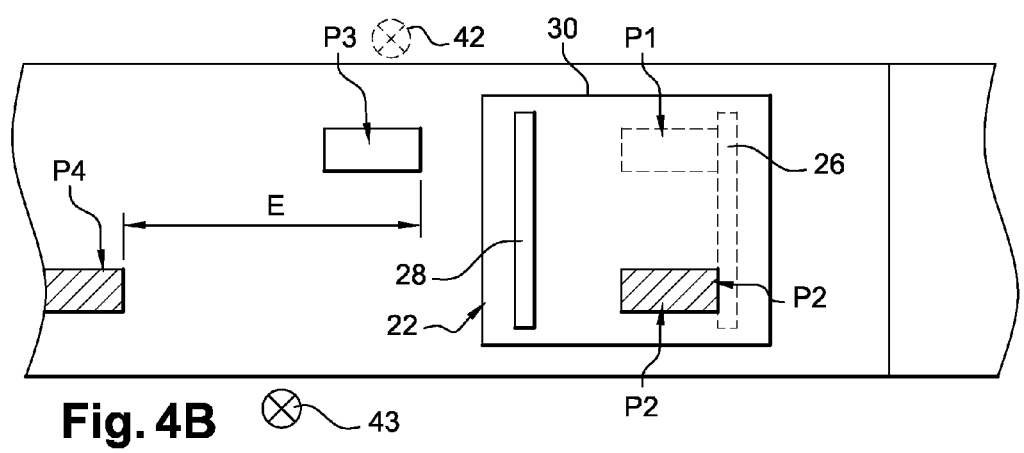

As shown in FIG. 4B, the products P1 and P2 of the batch L1 are grouped transversely one beside the other so as to form a row and are aligned in a transverse direction, which is orthogonal to the longitudinal direction of conveyance.

When arriving at the height of the downstream pulley 36, the first stop 26 is retracted and occupies its downstream standby position, represented in FIG. 5A. The drive belt 30 then passes from its active state to its passive state.

The tilting of the first stop 26 from a last vertical engaged position, which is shown in continuous line in FIG. 4A, to an intermediate disengagement position, which is shown in thin dashed line in FIG. 4A, is called the disengagement phase ph3.

Advantageously, when the arrangement 10 comprises second detection means 43, the phase of disengagement of the first stop 26 to its retracted position is then capable of being accelerated or on the contrary decelerated (time delay) depending on whether the real detected value of the upstream spacing E, different from the determined set point value, is respectively less than or greater than the latter.

When the first stop 26 is in its last vertical engaged position, the products P1 and P2 are then grouped in a row one beside the other so that the first batch L1 is made up.

The first product P1 of the batch L1 is then released by the first stop 26 during the disengagement phase ph3, which allows the products P1 and P2 forming the batch L1 to continue their longitudinal travel downstream at the traveling speed V1.

The end of the disengagement phase ph3 corresponds to the beginning of a phase called the deceleration phase ph4, during which the longitudinal driving speed VL of the drive belt 30 passes from the decelerated speed V2 to a zero speed, and during which the first stop 26 passes from its intermediate disengagement position to its downstream standby position, which is represented in heavy dashed line in FIG. 4A.

The phaser 22 has therefore carried out a first complete cycle corresponding to the formation of the first batch L1 by grouping on one and the same transverse row products P1 and P2 each traveling respectively in the first and second lines F1, F2 of the conveyor belt 12.

As illustrated by FIG. 5A, the second stop 28 occupying its upstream standby position, the phaser 22 is then ready to form a new batch Li of products Pn, Pn+1, namely the batch L2.

Advantageously, the decelerated speed V2 and the distance A1-A2 between the upstream pulley 34 and downstream pulley 36 are chosen so that the upstream spacing E between the two products P1, P2 reduces, under the phaser 22, until it reaches a zero value, corresponding to the transverse alignment of the first product P1 and of the second product P2 on one and the same row.

Thanks to the arrangement 10 according to the invention, it is possible to maintain a particularly high traveling speed V1, because, to make up the batch Li, the product Pn or the product Pn+1 is only decelerated and not temporarily stopped with a zero longitudinal speed VL as before with the phasing means according to the prior art.

This is why the invention makes it possible to achieve high speeds, for example of between 900 and 1100 products per minute, depending on the type of product, or speeds that are much higher than those achieved before with the solutions of the prior art.

The invention finds its application with all types of products but is however particularly advantageous for certain types of products, called nonaccumulatable products, for example products in sachets which do not have rigid bearing surfaces defining precise points of contact between the products.

In addition, the grouping of the products Pn and Pn+1 into a batch Li is carried out without disturbing the position of the products, or changing the orientation of the products.

Note furthermore that the value of the downstream spacing E' between two batches Li at the exit from the phaser 22 is substantially equal to the value of the upstream spacing E2 between the products Pn+1 of the second line F2.

Therefore, the minimum set point value of the upstream spacing E2 between the products Pn+1 of the line F2 of the lines F1, F2 which is not processed by the phaser 22 is advantageously determined so that the batches Li are sufficiently spaced to allow time for the grouper 24 to process each batch Li, in particular when the arrangement 10 works at high speeds.

Figure 6:
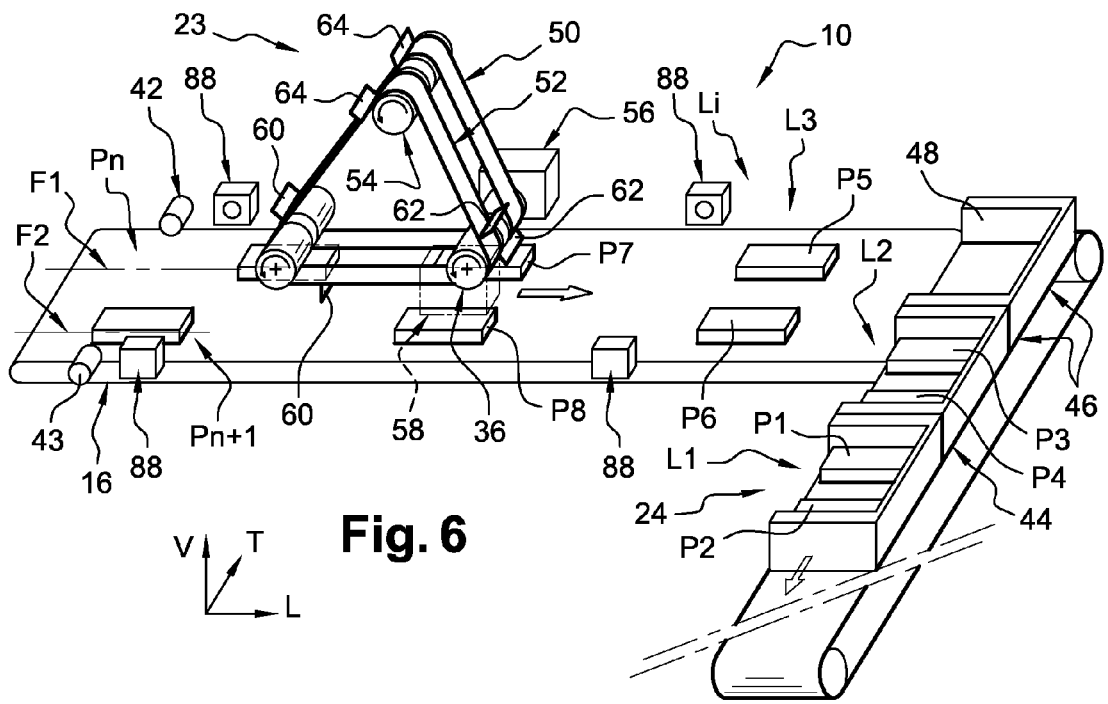
FIG. 6 is a view in perspective which represents schematically an arrangement comprising a phaser according to a second embodiment fitted with a first and a second drive belt in parallel.

An example of a grouper 24 of the type with cavities is represented in FIG. 6, with reference to a second embodiment of the arrangement 10 according to the invention.

This grouper 24 naturally is also well suited to the first embodiment in which it could without distinction be used.

The grouper 24 comprises a series 44 of cavities 46 which can be moved in a generally transverse direction, relative to the conveyor belt 12, that is to say in the direction in which the products Pn, Pn+1 are grouped into rows to form the batches Li.

Each cavity 46 delimits a housing 48 in the shape of a notch which is open on the side of the conveyor belt 12 in order to be able to receive a batch Li in the exit zone 20.

The series 44 of cavities 46 moves transversely haltingly so that there is always one empty cavity 46 facing the downstream end of the conveyor belt 12, standby for the arrival of a batch Li.

As soon as a batch Li fills the housing 48 of the empty cavity 46, the series 44 of cavities 46 is offset by one cavity 46 so as to be able to receive the next batch Li.

Thanks to placing in batches Li of the products Pn, Pn+1 upstream of the grouper 24 by means of the arrangement 10 according to the invention, it is possible to ensure that the grouper 24 will have a minimum interval or time gap necessary to offset the series 44 of cavities 46 and present an empty cavity 46 in front of the next batch Li.

Note that, if the arrangement 10 did not have the phaser 22 according to the invention, the speed of arrival of the products Pn, Pn+1 would necessarily have to be decelerated, in this instance at least divided by two in the case of a zigzag distribution sequence of one product out of two.

Specifically, without the intervention of the phaser 22, the grouper 24 then only has an insufficient time gap to carry out the offsetting of the series 44 of cavities 46, said time gap corresponding for example in this instance to the upstream spacing E reduced by the length of a product, that is to say the longitudinal distance of the upstream spacing between the product P2 of the second line F2 entering the cavity 46 in order to form the batch L1 therein with the product P1 lying therein and the product P3 of the first line F1 following it, from which in this instance the length of the product P2 will have been subtracted.

Consequently, the product P3 will then bump into the product P1 or a portion of the grouper 24 before the series 44 of cavities 46 has been able to be completely offset.

In the first embodiment of the arrangement 10 according to the invention, it is more particularly the set point value of the upstream spacing E1 or E2 between two successive products of the first line F1 or the second line F2 reduced by the length of a product Pn or Pn+1 which corresponds to the minimum time gap necessary to carry out the offsetting of the series 44 of cavities 46 making it possible to optimize the operation thereof and achieve high speed.

Now, by comparison with the first embodiment, a second embodiment of the arrangement 10 according to the invention comprising an enhanced phaser 23 which is shown in FIGS. 6 to 12 will be described.

The phaser 23 differs from that of the first embodiment mainly by the fact that it comprises two similar drive belts 50, 52 arranged in parallel, and by the fact that each drive belt 50, 52 is wound about a third pulley 54 which is arranged above the associated lower strand 38 and above the associated upstream pulley 34 and downstream pulley 36.

In FIGS. 8 to 12, the two drive belts 50, 52 are seen in a superposed manner.

The first drive belt 50 and second drive belt 52 are arranged side by side, in a manner that is substantially symmetrical relative to a longitudinal vertical plane of symmetry preferably forming a mid-plane of the conveyor belt 12 and of the first and second lines F1, F2.

The first drive belt 50 and second drive belt 52 are driven independently, respectively by a first servomotor 56 and a second servomotor 58.

Each drive belt 50, 52 in this instance comprises a first stop 60, a second stop 62 and a third stop 64 which are evenly spaced along the drive belt 50, 52 and which are similar to the stops 26, 28 of the first embodiment.

Note that the number of stops 60, 62, 64 could be different, the important thing being that there is always a stop 60, 62, 64 in the upstream standby position when a product, in this instance a product Pn of the first line F1, is detected by the cell of the sensor 42, and that there are not two stops 60, 62, 64 of one and the same drive belt simultaneously in the engaged position.

Preferably, the surface of contact 66, or surface of engagement, of each stop 60, 62, 64 with the products Pn is offset transversely toward the opposite drive belt 50, 52, so that each surface of contact 66 is generally centered transversely relative to the conveyor belt 12 and more precisely relative to the first line F1 of products Pn and to the second line F2 of products Pn+1 so as to be able to act on the products Pn and on the products Pn+1.

This makes it possible to ensure an engagement with the products Pn and/or Pn+1 that is substantially identical whichever stop 60, 62, 64 is engaged and whichever drive belt 50, 52 is in the active state.

The stops 60, 62, 64 in this instance comprise additional standby positions, relative to the positions described with reference to the first embodiment.

For example, considering the first drive belt 50, when the first stop 60 occupies its upstream standby position and the second stop 62 occupies its downstream standby position, then the third stop 64 occupies a middle standby position, situated halfway between the downstream standby position and the upstream standby position, in the vicinity of the third pulley 54.

Figure 8:
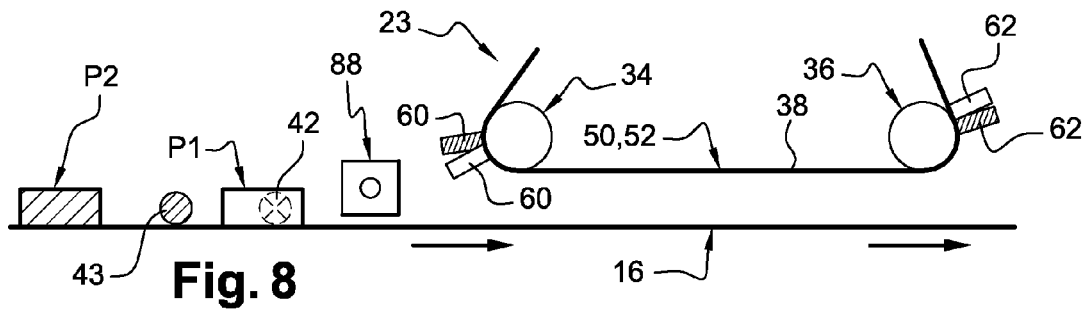
FIG. 8 is a view similar to that of FIG. 2 which represents the phaser of FIG. 6 when the two drive belts are in the passive state.

In FIG. 8, the first stop 60 and second stop 62 of the first drive belt 50 are represented respectively in their upstream and downstream standby positions.

Since the stops 60, 62, 64 of the two drive belts 50, 52 cannot simultaneously occupy identical positions, when the first stop 60 of the first drive belt 50 occupies its upstream standby position, the stops 60, 62, 64 of the second drive belt 52, which are represented with hatching in FIGS. 8 to 12, occupy standby positions that are offset relative to the standby positions of the stops 60, 62, 64 of the first drive belt 50.

Therefore, in FIG. 8, the first stop 60 of the second drive belt 52 occupies an upstream standby position that is offset by a few degrees of angle of rotation of the upstream pulley 34, relative to the upstream standby position of the first stop 60 of the first drive belt 50.

In a similar manner, the other two stops 62, 64 of the second drive belt 52 are offset relative to the corresponding stops 62, 64 of the first drive belt 50.

The working principle of the second embodiment is similar to the first, but it makes it possible to process the flow of products at a faster speed.

Specifically, the presence of a second drive belt 52 makes it possible to begin the formation of a second batch L2 before the first batch L1 has been released by the first drive belt 50.

In FIG. 8, the phaser 23 is represented in the passive state, the stops 60, 62, 64 occupying the standby positions described above.

The detection signal transmitted by the sensor 42, when it detects a product Pn, in this instance the first product P1 of the first line F1, causes the first drive belt 50 of the phaser 23 to pass from its passive state to its active state.

Figure 9:
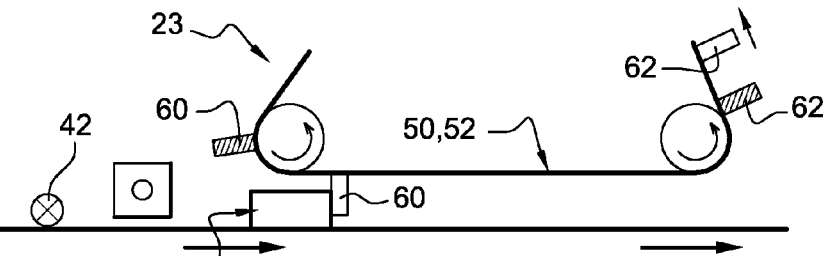
FIG. 9 is a view similar to that of FIG. 8 which represents the phaser when the first belt is in the active state at the beginning of the engagement of a stop with a product, the second drive belt being in the passive state.
Figure 12:
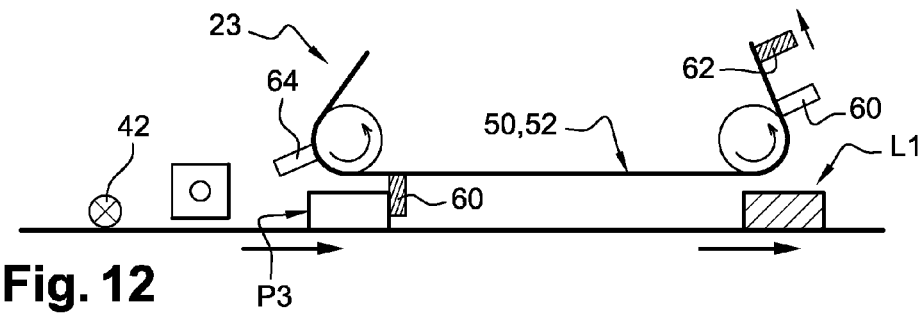
FIG. 12 is a view similar to that of FIG. 8 which represents the first drive belt in the passive state and the second drive belt in the active state.

The first servomotor 56 is started up so that the first stop 60 of the first drive belt 50 passes from its upstream standby position to its engaged position, which is shown in FIG. 9, and continues its movement up to its downstream standby position, which is shown in FIG. 12.

Shortly after the start-up of the first servomotor 56, or simultaneously, the second servomotor 58 is started up as well, until the first stop 60 of the second drive belt 52 occupies its upstream standby position.

Figure 10:
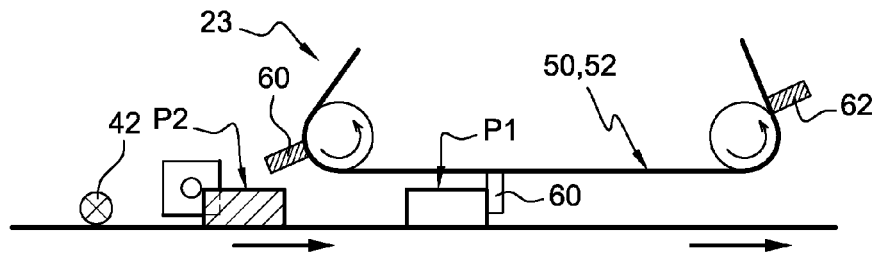
FIG. 10 is a view similar to that of FIG. 8 which represents the decelerating of the product by the stop of the first drive belt and the upstream standby position of a stop of the second drive belt.

As soon as the first stop 60 of the second drive belt 52 reaches its upstream standby position, the second servomotor 58 is stopped, awaiting the arrival of a third product P3 of the first line F1, while the first drive belt 50 is still driven, which is illustrated by FIG. 10.

The second product P2 is situated in the second line F2 and immediately upstream of the first product P1 of the first line F1 with an upstream spacing E whose value will progressively reduce until it reaches a zero value.

Specifically, the second product P2 progressively joins the first product P1 which is decelerated by the first stop 60 of the first drive belt 50 in order to form a first batch L1.

Shortly before the retraction of the first stop 60 of the first drive belt 50, the sensor 42 detects the arrival of a third product P3 belonging to the first line F1 which starts up the second servomotor 58, the second drive belt 52 then passing from its passive state to its active state.

Figure 11:
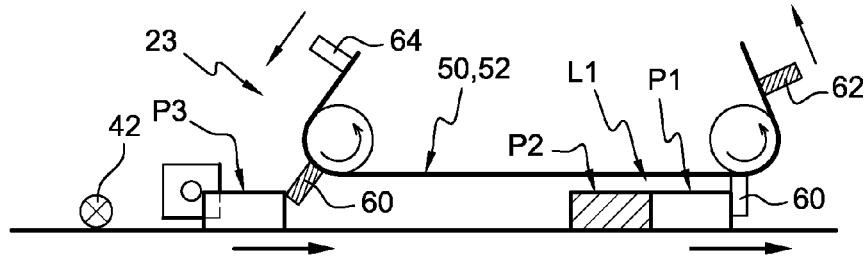
FIG. 11 is a view similar to that of FIG. 8 which represents a first batch of products grouped into rows before it is released by the stop of the first drive belt and which represents the beginning of the engagement of a stop of the second drive belt with a product.

The first stop 60 of the second drive belt 52 then occupies an engaged position, which is illustrated by FIG. 11, so as to decelerate the third product P3 in order to form with a fourth product P4 of the second line F2 a second batch L2.

The second batch L2 is immediately upstream of the first batch L1 formed by the grouping into rows of the products P1 and P2, with a spacing corresponding to the upstream spacing E2.

The first batch L1 being made up, the first stop 60 of the first drive belt 50 retracts and occupies its downstream standby position, while the third associated stop 64 occupies its upstream standby position, then the first servomotor 56 is stopped. The first drive belt 50 has then returned to its passive state, which is illustrated by FIG. 12.

The first drive belt 50 is again ready to process other products Pn of the first line F1 in order to decelerate them and form the next batches Li.

The first stop 60 of the second drive belt 52 continues its longitudinal movement, which corresponds to the situation of the first drive belt 50 illustrated by FIG. 9.

The process is repeated in this way for each stop 60, 62, 64 of each drive belt 50, 52, depending on the arrival of the products Pn.

Figure 7:
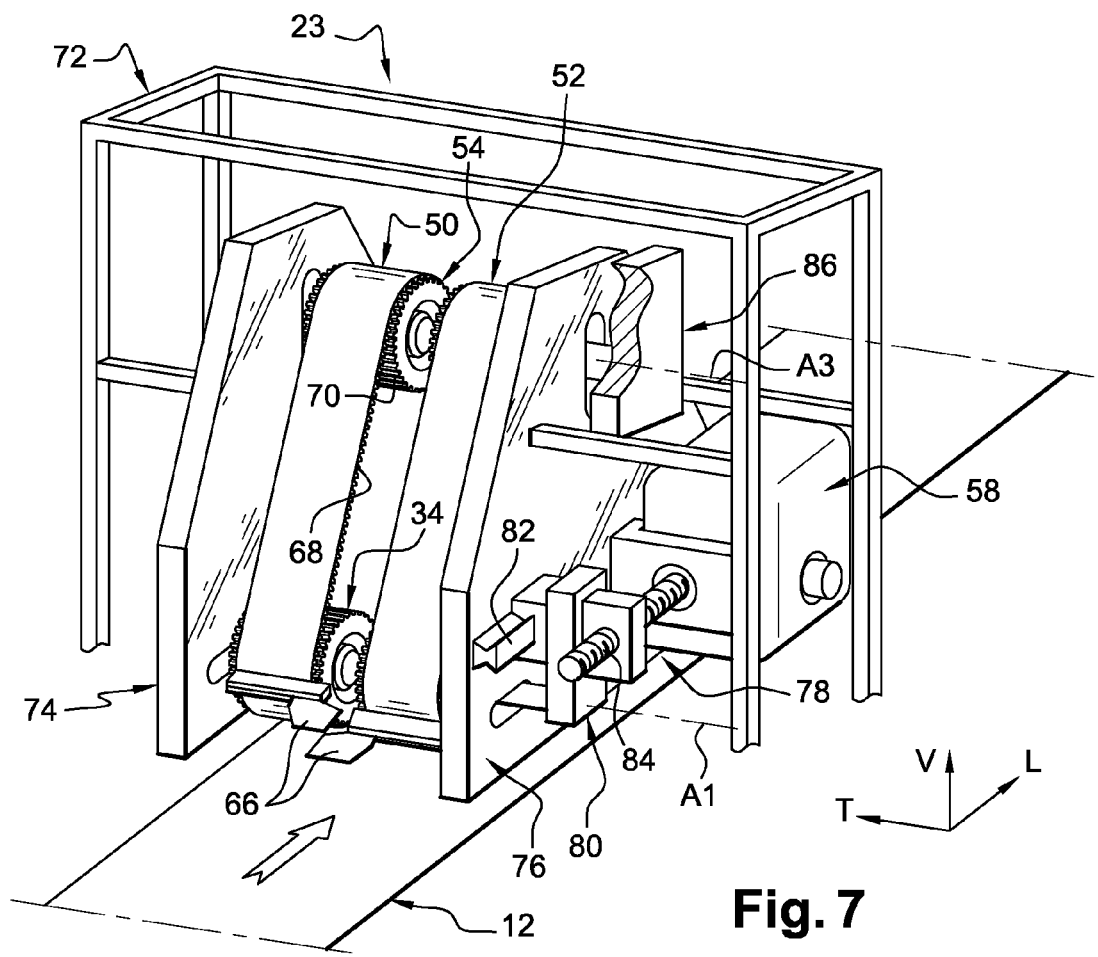
FIG. 7 is a view in perspective which represents the phaser of FIG. 6 in a more detailed manner.

Now will be described the advantageous features of the preferred embodiment of the phaser 23 according to the invention, notably with reference to FIG. 7.

Preferably, the inner surface 68 of the drive belts 50, 52 is notched in order to interact with matching transverse notches supported by the axial drive surface 70 of the pulleys 34, 36, 54.

The phaser 23 is supported by a framework in the shape of a gantry 72 which rests, for example, on the ground (not shown) and which is attached relative to the conveyor belt 12.

Note that the mounting of the phaser 23 on a gantry 72 makes it possible to easily arrange it above any conveyor belt 12, and makes it possible to choose easily its longitudinal position between the entrance zone 18 and exit zone 20.

Advantageously, the phaser 23 is mounted so as to be able to move transversely on the gantry 72 which comprises adjustment means (not shown) so as to make it possible notably to adjust the transverse position of the phaser 23 with precision relative to the lines F1, F2 of products traveling on the conveyor belt 12.

As a variant, the phaser 23 is secured to the gantry 72 which is mounted so as to be able to move at least transversely relative to the conveyor belt 12, preferably also longitudinally and/or vertically.

The gantry 72 comprises, on either side of the conveyor belt 12, two vertical longitudinal plates 74, 76 which respectively support the pulleys 34, 36, 54 associated with the first drive belt 50 and the pulleys 34, 36, 54 associated with the second drive belt 52.

Advantageously, the phaser 23 comprises means 78 for the adjustment of the distance A1-A2 between the upstream pulley 34 and the downstream pulley 36 of each drive belt 50, 52.

The adjustment of the distance A1-A2 makes it possible notably to adapt the length of the lower strand 38 of each drive belt 50, 52 notably relative to the upstream spacing E between the products Pn and Pn+1 of the lines F1, F2 and the longitudinal dimension of the products Pn, Pn+1.

According to the embodiment represented here, the axis A1 of each upstream pulley 34 is supported by a slide 80 which can be moved translationally on a longitudinal rail 82 fixed to the associated support plate 74, 76.

The longitudinal movement of each slide 80 is controlled in this instance by an adjustment screw 84 fixed to the associated support plate 74, 76.

Advantageously, the phaser 23 comprises means 86 for taking up the tension of each drive belt 50, 52.

These means 86 comprise, for example, a vertical rail and slide system (not shown) making it possible to move the axis A3 of the third pulley 54 in vertical translation, relative to the associated support plate 74, 76.

The means 86 for taking up the tension may operate automatically, for example by means of an elastic device which vertically pushes the axis A3 of the third pulley 54 upward.

Naturally, optimal and high-speed operation is obtained when at least the upstream spacing E between the products Pn and the products Pn+1 has a determined constant value and the spacings E1 and E2 of the products of each of the lines F1, F2 advantageously also have a determined constant value.

However, the values of the upstream spacings E, E1 and E2 of the products Pn, Pn+1 are in practice subjected to greater or lesser differences which can be put down notably to the conveyance or else to the use of a control device intended to eliminate nonconforming products, for example because of their weight, consequently causing "gaps" in the lines of products.

According to a particularly advantageous feature of the invention, the operation of the phaser 22, 23 is not affected by such a fluctuation in the values of the upstream spacings E, E1 and E2 because the operation in movement of the drive belt 30, 50, 52 and of the stops is carried out selectively according to the detection of the products.

It will be understood that such differences are on the other hand capable of causing malfunctions in the grouping of the products with the known solutions of the prior art.

According to another advantageous feature of the invention, the arrangement 10 comprises a device 88 for ejecting products Pn from the first line F1 and/or of the products Pn+1 from the second line F2.

Advantageously, such an ejection device 88 is for example used to deal with the particular case described above according to which the value of the difference in the upstream spacing E is greater than the associated minimum set point value.

Preferably, the arrangement 10 comprises at least one product ejection device 88 arranged downstream of the phaser 22, 23, notably to prevent possible malfunctions and to eliminate any nonconforming batch of products before the cavities 46 of the grouper 24.

Such malfunctions of the arrangement 10 are for example due to upstream spacings E1 between the products Pn of the line F1 and/or to upstream spacings E2 between the products Pn+1 of the line F2 or else to upstream spacings E between a product Pn of the line F1 and a product Pn+1 of the line F2 having values greater than or less than the determined minimum set point values which, in a general manner, do not make it possible to group them into a row correctly one beside the other in order to form the batch Li or to proceed to the offsetting of the cavities of the grouper 24.

The ejection device 88 comprises, for example, means (not shown) for producing a jet of compressed air capable of pushing a product Pn of the first line F1 and/or a product Pn+1 of the second line F2 transversely off the conveyor belt 12.

Preferably, the air-jet means of the ejection device 88 are arranged transversely on either side of the longitudinal edges of the conveyor belt 12 and associated with each of the lines F1, F2.

Advantageously, the ejection device 88 comprises means that are in this instance arranged upstream and downstream of the phaser 22, 23.

Advantageously, the arrangement 10 comprises means (not shown) for recovering the products ejected by the device 88 from the conveyor belt 12.

Preferably, the ejection device 88 is operated according to the detection signal produced by the sensor 42 associated with the first line F1 so that, when the latter detects the arrival of a product Pn upstream which is too close to or too far from the product Pn situated immediately downstream, that is to say with an upstream spacing E1 less than or greater than the set point value, the ejection device 88 causes the upstream product Pn to be ejected from the conveyor belt 12.

Similarly, the ejection device 88 is capable of being operated according to the detection signal produced by the other sensor 43 associated with the second line F2 so that, when the latter detects the arrival of a product Pn+1 upstream which is too close to or too far from the product Pn+1 situated immediately downstream, that is to say at an upstream spacing E2 less than or greater than the set point value, the ejection device 88 causes the upstream product Pn+1 to be ejected from the conveyor belt 12.

Preferably, malfunctions relating to the upstream spacings E1 or E2 are dealt with by the means of the ejection device 88 arranged upstream of the phaser.

Naturally, when the values of the upstream spacing E1 and/or of the upstream spacing E2 differ from the determined set point values, the upstream spacing E is also necessarily affected and cannot be equal to its minimum set point value.

Preferably, malfunctions relating to the upstream spacing value E are dealt with by the means of the ejection device 88 arranged downstream of the phaser when the products have not been eliminated by the upstream means or when the arrangement comprises ejection means 88 only downstream of the phaser.

Advantageously, the detection signals of the sensors 42, 43 are therefore used to check that the upstream spacing E between a product Pn of the first line F1 and a product Pn+1 of the second line F2 is correct, that is to say, less than or equal to the minimum set point value.

Failing this, the ejection device 88 is then operated to cause the products Pn, Pn+1 concerned to be ejected from the conveyor belt 12 to eliminate any risk of malfunction.

Preferably, if a product Pn of the first line F1 intended to make up a batch Li is ejected, then the product Pn+1 of the second line F2 is also systematically ejected so as to eliminate all the products of a batch Li and prevent an incomplete batch Li from being transmitted to the grouper 24.

Reciprocally, if a product Pn+1 of the second line F2 is ejected, then the product Pn of the first line F1 situated downstream is also ejected to prevent transmitting a nonconforming batch Li to the grouper 24.

Advantageously, the phaser 22, 23 awaits the arrival of the next products Pn, Pn+1 in the lines F1, F2 in order to form a new batch Li.

This prevents the first product P1 or the second product P2 of the batch L1 from entering on its own the corresponding cavity 46 of the grouper 24.

Advantageously, the grouper 24 may comprise means (not shown) for detecting the absence of a batch Li of products Pn, Pn+1 so as not to operate the offsetting of the cavities 46 and to await the arrival of the next batch Li.

The operation of the arrangement 10 according to the invention may then continue according to the normal operating system described above.

According to the design described and represented in the first and second embodiments, the arrangement 10 according to the invention comprises a phaser 22, 23 which is centered transversely relative to the lines F1, F2.

In the case of a centered phaser, the alignment of the two products Pn and Pn+1 one beside the other is ensured because each of these products Pn and Pn+1 interacts with the upstream vertical face of the stop before or at the time of the tilting of the latter during the disengagement phase.

According to another design not represented, the arrangement 10 comprises a phaser 22, 23 which is preferably positioned vertically above the conveyor belt 12 but which is centered on one of the lines, for example the first line F1, so as to act only on the products Pn that it contains.

In such a design, the stop of the phaser 22, 23 can act only on the products Pn of the first line and no longer on the products Pn+1 of the second line F2.

Therefore, since the second product P2 of the second line F2 is not decelerated by the stop of the phaser 22, 23 or does not interact with the upstream vertical face of the latter, it traverses the conveyor belt 12 from the entrance zone 18 to the exit zone 20, including the intermediate zone of the conveyor belt 12 comprising the phaser 22, 23, at a constant speed equal to the traveling speed V1.

In comparison, the first product P1 of the first line F1 also traverses the conveyor belt 12 from the entrance zone 18 to the exit zone 20 with a traveling speed V1, except for the intermediate zone of the conveyor belt 12 comprising the phaser 22, 23 where it is decelerated to the decelerated speed V2 so as to progressively remove the upstream spacing E existing between the products Pn and Pn+1 and thereby make up a rowed batch Li.

Advantageously, the phaser 22, 23 is then mounted so as to be movable transversely in order to be able to be arranged selectively above the first line F1 of products Pn or of the second line F2 of products Pn+1 depending on the characteristics of the distribution sequence of the products, notably of the product, called the first product, and of the upstream spacings between the products of each line F1, F2 and from one line to the other.

As a variant, each of the lines F1 and F2 comprises an associated phaser 22, 23 which is capable of being operated selectively according to the determined sequence of distribution of products Pn, Pn+1 to be processed in order to group them successively into batches Li.

Preferably, when the phaser 22, 23 is centered on one line F1 of the lines F1, F2, the arrangement 10 comprises additional detection means (not shown), such as at least one sensor and/or one coder, which are capable of detecting at least the arrival and/or the position of a product of the other line F2 of the lines F1, F2 on the conveyor belt 12.

Advantageously, the phaser 22, 23 being centered on the first line F1 of products Pn, the additional sensor is arranged slightly upstream of the axis A2 of the phaser so as to produce a signal representative of the determined position of a product Pn+1, such as P2, of the second line F2.

Advantageously, the signal supplied by the detection means is capable of being used in real time for the operation of the phase 22, 23, in particular for synchronizing the phase ph3 of disengagement of the stop, and to obtain a perfect alignment in the transverse direction of the products Pn, Pn+1, for example of the product P2 with the product P1 forming the batch L1.

According to a variant not shown, the arrangement 10 is capable of making up batches Li grouping into rows more than two products Pn, for example a batch Li made up by a row comprising three products aligned transversely side by side.

For that, the arrangement 10 comprises a conveyor belt 12 on which the products travel distributed in three longitudinal lines F and at least a first phaser 22, 23 and a second phaser 22, 23 operating simultaneously or successively on two of the three lines of products.

In the case of a distribution sequence for which the first product P1 is, considering the products of the two lines F1, F2, the product situated furthest downstream, the phasers 22, 23 are then arranged so that the first phaser first groups into rows the products P2 and P3 while decelerating that of the two products which is situated furthest downstream, and then so that the second phaser acts to decelerate the first product P1 until it is joined by the products P2 and P3 situated immediately upstream and so that a batch Li is finally made up grouping the three products P1, P2, P3 into a row.

The arrangement 10 according to the invention does not require a specific conveyor belt 12, which makes it possible to minimize the costs and which makes it possible, for example, to modify an existing installation at low cost in order to make it capable of handling products at high speed.

An exemplary application will be described below, in an installation 90 for packaging products, of an arrangement 10 according to the invention comprising phasing means such as a phaser 22 or a phaser 23 according to one of the embodiments described above.

The product-packaging installation 90 is designed to group products into a batch Li, notably for the purpose of transferring said batches of products to a boxing machine (not shown).

Figure 13:
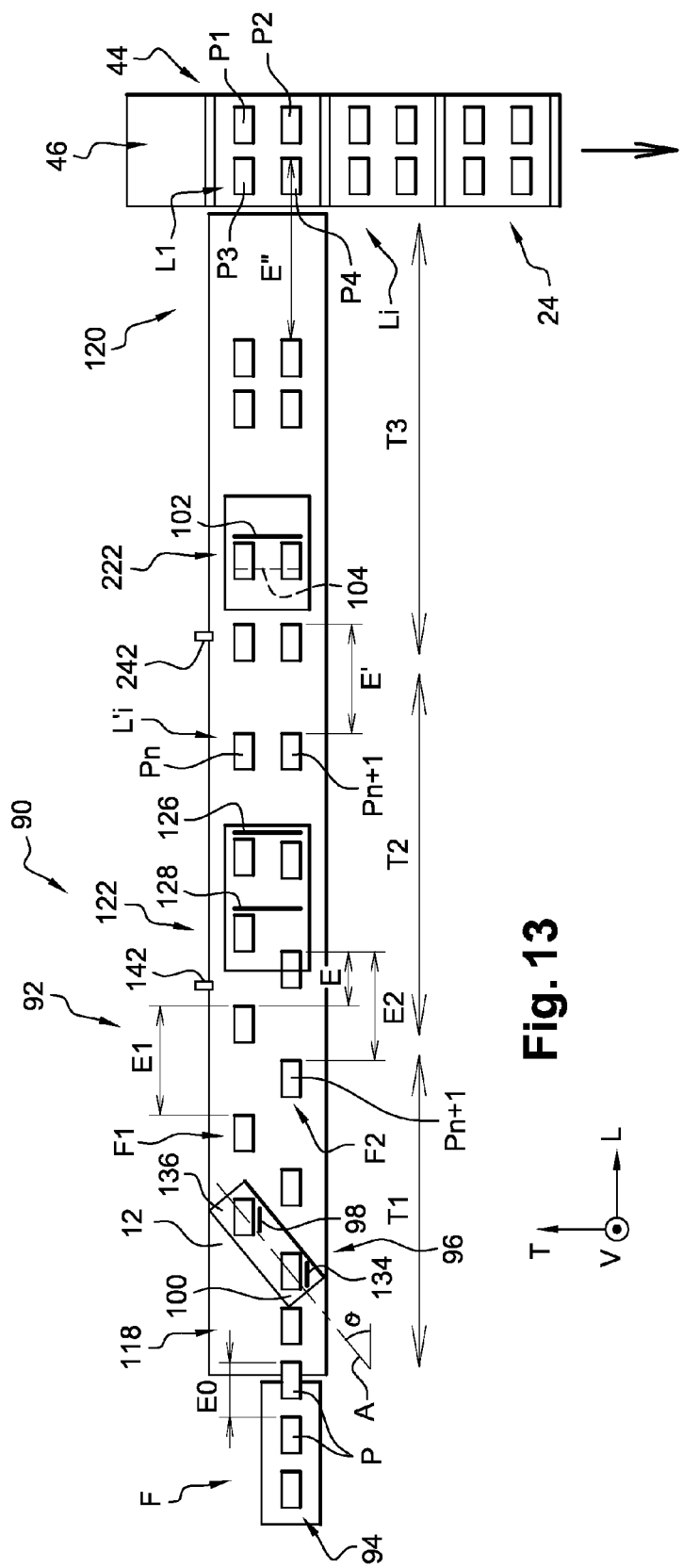
FIG. 13 is a top view of a packaging installation illustrating an exemplary embodiment of the arrangement according to the invention.

FIG. 13 shows a packaging installation 90 comprising a conveyor line 92 which extends longitudinally along a conveyor belt 112 on which the products P to be transferred travel upstream to downstream.

The installation 90 comprises successively from upstream to downstream a device 14 for feeding the conveyor line 92 with products, a device 16 for distributing the products, a device for grouping the products into batches Li comprising at least first phasing means 122 and second phasing means 222.

In this example, the batches Li comprise four products P which are grouped so as to be included globally in a square, namely a batch Li formed respectively of two rows of two products or else of two columns of two products.

The feeder device 14 comprises in this instance a feeder conveyor belt 94 which transfers a line F of products P separated longitudinally by an upstream spacing E0 to an entrance zone 118 of the conveyor belt 112.

A distribution device 16 is arranged, downstream of the entrance zone 118, on a first upstream section T1 of the conveyor belt 112 in order to distribute the products P of the line F on the upper face 132 of the conveyor belt 112 according to a determined distribution sequence.

Advantageously, the distribution device 16 comprises a phaser 96 which comprises at least one stop, in this instance two stops 98, 100, and which is arranged relative to the conveyor belt 112 so as to distribute the products P of the line F in order to form at least a first line F1 of products P, designated Pn hereinafter, and a second line F2 of products P, designated Pn+1 hereinafter, which is parallel to the first line F1.

The phaser 96 is similar to the phaser 22 described for example for the first embodiment and represented in FIGS. 2 to 5 and differs therefrom essentially by its oblique position relative to the longitudinal direction of travel of the conveyor belt 112 and by the position of the stops 98, 100 which move transversely, in this instance from right to left.

Advantageously, the phaser 96, to operate the stops 98, 100, comprises a drive belt that is wound between a right pulley 134 and a left pulley 136 with axes A1-A2, a main axis A which is defined as the axis parallel to the drive belt of the phaser and orthogonal to the axes A1-A2 of the pulleys.

The oblique position of the phaser 96 is defined by the main axis A the intersection of which with the longitudinal direction of travel of the conveyor belt 112 forms an acute angle $\theta$.

The two pulleys are arranged above the conveyor belt 112 so that the lower strand of the drive belt extends substantially parallel to the upper face 132 of the conveyor belt 112 and so that the stops 98, 100 extend parallel to the longitudinal direction of travel of the conveyor belt 112, that is with an angle $\theta$ relative to the main axis A of the phaser 96.

The right pulley is capable of being rotated by means of a servomotor capable of rotating the drive belt, supporting the stops 98, 100, about the pulleys in the same direction as the conveyor belt 112 and with a speed V for driving the stops 98, 100 determined so that the longitudinal component VL of the driving speed is substantially equal to the traveling speed V1 of the conveyor belt 112.

The product distribution sequence downstream of the phaser 96 is in this instance similar to that represented above for the first and second embodiments, namely a zigzag distribution with alternation of one product out of two.

Therefore, the first line F1 is made up of products Pn positioned with an upstream spacing E1 between two successive products P1, P3, P5 etc. and the second line F2 is made up of products Pn+1 positioned with an upstream spacing E2 between two successive products P2, P4, P6 etc.

The first and second lines F1 and F2 out of phase with one another have an upstream spacing E between two successive products Pn, Pn+1 belonging respectively to each of the lines F1, F2.

The products Pn of the line F1 and the products Pn+1 of the line F2 therefore distributed in a zigzag then travel a second intermediate section T2 of the conveyor belt 112 comprising the first phasing means consisting of a phaser 112.

Advantageously, the phaser 122 is structurally identical to one or other of the phasers 22, 23 described respectively in the first and second embodiments and will therefore not be described in detail below.

The phaser 122 comprises a stop 126 and a stop 128 which are driven at a decelerated speed V2 by a servomotor the start-up of which is advantageously operated depending on the detection signal of a sensor 142.

The operation of the phaser 122 is similar so that, downstream of the phaser 122, the products Pn, Pn+1 of the lines F1 and F2 are grouped in rows so as to form batches L'i, called intermediate batches, comprising respectively a product Pn and a product Pn+1 grouped transversely side by side.

The intermediate batches L'i then travel a third downstream section T3 of the conveyor belt 112 comprising the second phasing means 222.

The second phasing means 222 are in this instance designed to group two intermediate batches L'i made up previously by the first phasing means 122 in order to form a batch Li.

The second phasing means 222 comprise at least one phaser preferably identical to one or other of the phasers 22, 23 described respectively in the first and second embodiments or else as described in the aforementioned patent application FR No 05 50528 to which reference should be made for more ample details.

The phaser 222 is arranged above the conveyor belt 112 and is centered relative to the lines F1 and F2.

The phaser 222 comprises respectively at least a first stop 102 and a second stop 104, for example similar to the stops 26, 28 of the phaser 22.

When the products P1, P2 forming the first intermediate batch L'i arrive head on, they are advantageously detected by detection means, such as a sensor 242, which operates in a synchronous manner the start-up of the servomotor of the phaser 222.

The first stop 102 then passes from its upstream standby position (passive state) to its engaged position (active state) in which it is driven longitudinally downstream at a decelerated speed V'2.

Since the decelerated speed V'2 is lower than the traveling speed V1, the first product P1 and second product P2 forming the first intermediate batch L'1 meet the stop 102 of the phaser 222 and butt against the upstream transverse face of the latter consequently causing the products P1, P2 to slide on the conveyor belt 112 at a speed V'2 until said stop 102 reaches its retracted position.

The first product P1 and the second product P2 are then progressively joined by the products P3 and P4 of the next intermediate batch L'i which belong respectively to the first and second lines F1, F2, and which, downstream of the phaser 122 and upstream of the phaser 222, are initially separated by a spacing E' which is equal to the upstream spacing E2 between the products Pn+1 of the second line F2.

Specifically, the spacing E' between the products P1 and P2 of the batch L'i on the one hand and the products P3 and P4 of the batches L'2 on the other hand will progressively diminish under the phaser 222 until it reaches a determined, nonzero value, the products P1 and P2 advantageously being released before the products P3 and P4 come into contact with them in order to prevent any risk of overlap.

Thanks to the invention, this makes up a final batch L1 comprising in this instance four products P1, P2, P3 and P4 which are grouped two by two in rows and columns.

Advantageously, in the exit zone 120 of the conveyor belt 112 situated downstream of the phaser 222, the downstream spacing E'' between two batches Li is substantially equal to twice the value of the spacing E' between the intermediate batches L'i.

Advantageously, the packaging installation 90 comprises successively first phasing means 122 and second phasing means 222 when the difference between the traveling speed V1 of the conveyor belt and the decelerated speeds of the phasing means required to form the batches L'i or Li is considerable, for example when the traveling speed V1 is twice as great as the necessary decelerated speed.

As a variant, the packaging installation 90 comprises only first phasing means 122 the features of which, such as the length of the drive belt, the position of the stops or else the decelerated speed V2, are determined so that the grouping into rows of the first and second products P1, P2 then the grouping of the next products P3 and P4 take place underneath the lower strand of the phaser 122.

The packaging installation 90 comprises, downstream of the exit zone 120 of the conveyor belt 112, a grouper 24 comprising a series 144 of cavities 146 which is movable in the transverse direction and of which the cavities 146 are open in the direction of the conveyor belt 112.

The first batch L1 fills one of the empty cavities 146, then the series 144 is offset by one cavity to receive the next batch L2 so that the batches Li of products are for example transferred by the grouper 24 to a boxing machine.

Advantageously, the invention also relates to a method for the grouping into rows of several products Pn, Pn+1 in the form of batches Li, notably in order to allow them to be boxed, the products Pn, Pn+1 being transported by a conveyor belt 12 which travels at a determined speed V1, called the traveling speed, the products Pn, Pn+1 arriving on the upstream side of the conveyor belt 12 while being placed in at least two parallel longitudinal lines F1, F2 comprising respectively products Pn and products Pn+1 which, from one line F1 to the other F2, are offset from one another by at least a determined upstream spacing E and leaving on the downstream side of the conveyor belt 12 in batches Li comprising at least two products Pn, Pn+1.

The grouping method consists in at least:
  a decelerating step during which at least one product, called the first product P1, situated in one of the lines F1 of the lines F1, F2 is decelerated on the conveyor belt 12, relative to a second product P2 situated immediately upstream on the other line F2 of the lines, without changing the traveling speed V1 of the conveyor belt, at least until the spacing E between the second product P2 and the first product P1 reaches a zero value, so as to form a batch L1 made up by the grouping into rows of the products P1 and P2, that is to say grouped side by side and aligned in a transverse direction which is orthogonal to the longitudinal direction of conveyance, and
  a releasing step during which at least the decelerated product P1 is released so that the batch L1 formed by the products P1 and P2 continues its movement downstream at the traveling speed V1 of the conveyor belt 12.

Naturally, the invention is in no way limited to the embodiments described and represented.

As a variant, the drive belt of the phaser is not driven sequentially according to a detection signal operating the start-up of the servomotor but continuously at a constant decelerated speed V2 which is determined as a function notably of the upstream spacing E1 between the products Pn and the upstream spacing E between the products Pn and Pn+1 of the lines F1 and F2.

As a variant, the grouper 24 comprises a series 44 the cavities 46 of which are designed to be each filled not by a batch Li comprising several products but by one of the products grouped into a row forming the batch Li.

When the product Pn of the first line F1 and the product Pn+1 of the second line F2 previously grouped transversely into a row by the phaser 22, 23 arrive head on in the exit zone 120, each of the products Pn, Pn+1 is received in a cavity 46 that is longitudinally opposite, each cavity 46 being centered on one of the lines F1 or F2.

This therefore simultaneously fills two adjacent cavities 46 so that the series 44 of cavities 46 is offset by one pitch corresponding to two cavities 46 in order to present two empty cavities 46 to receive respectively the products Pn, Pn+1 of the next batch Li.

As a variant, the drive belt of the phaser 22, 23 is driven in the opposite direction relative to the conveyor belt 12 so that the stops 26, 28 move from downstream to upstream at a speed V which is advantageously greater than the traveling speed V1 of the conveyor belt 12.

The stop 26 of the phaser 22 is for example capable of causing a product Pn of the line F1 to slide on the upper face of the conveyor belt 12 so as to accelerate the product Pn so that it joins the product Pn+1 that is downstream and thereby reduces the upstream spacing E between the two successive products Pn, Pn+1 to a determined value which in this instance is zero.

The invention claimed is:

1. An arrangement (10) for the grouping of several products (Pn,Pn+1) in the form of batches (Li), wherein the products (Pn, Pn+1) are transported on at least one conveyor belt (12) which runs in a longitudinal direction from an upstream entrance zone (18) to a downstream exit zone (20), at a determined speed (V1) called the traveling speed, wherein the products (Pn, Pn+1) are placed longitudinally on the conveyor belt in at least one first line (F1) of products and one second line (F2) of products parallel to the first line (F1) and comprising respectively products (Pn, Pn+1) which, from one line (F1) to the other line (F2), are offset longitudinally from one another by at least one upstream spacing (E), and comprising phasing means (22, 23) which, arranged on the path of the products (Pn, Pn+1) between the entrance zone (18) and the exit zone (20), are capable of forming batches (Li, L1) made up by the grouping of at least two products (Pn, P1) and (Pn+1, P2) in a transverse row, the phasing means (22, 23) comprising at least one phaser (22, 23) which comprises at least one stop (26, 28, 60, 62, 64) operated successively between:
  at least one engaged position in which the stop (26, 28, 60, 62, 64) is interposed, by contact, in front of a product (Pn, P1) of one (F1) of the lines (F1, F2) for the purpose of decelerating it until it is joined by at least one other product (Pn+1, P2) situated immediately upstream on the other (F2) of the lines (F1, F2), and
  at least one retracted position which makes it possible to let the previously-formed batch (Li, L1) to continue its movement downstream at the traveling speed (V1),
characterized in that the phaser (22, 23) comprises at least one drive belt (30, 50, 52) which supports at least the stop (26, 28, 60, 62, 64) and which is arranged on the side of the upper face (32) of the conveyor belt (12), in that the drive belt (30, 50, 52) is wound onto at least two drive pulleys (34, 36, 54) so that a lower strand (38) of the drive belt (30, 50, 52) extends substantially parallel to the upper face (32) of the conveyor belt (12), the stop (26, 28, 60, 62, 64) occupying engaged positions when it is situated on the lower strand (38), and in that the phaser (22, 23) comprises means (40, 56, 58) for rotating the pulleys (34, 36, 54) so that the longitudinal speed (VL) for driving the stop (26, 28, 60, 62, 64) downstream by the drive belt (30, 50, 52) in the engaged position is equal to a determined speed (V2) called the decelerated speed, less than the traveling speed (V1), in order to transversely align the products (Pn) and (Pn+1) in a row to form the batch (Li).

2. The arrangement (10) as claimed in claim 1, characterized in that the stop (26, 28, 60, 62, 64) is operated from its engaged position to its retracted position when the spacing between the two products (Pn, Pn+1) of the batch (Li) reaches a substantially zero determined value.

3. The arrangement (10) as claimed in claim 2, characterized in that the drive belt (30, 50, 52) comprises a passive operating state in which it is stopped, each stop (26, 28, 60, 62, 64) occupying a retracted standby position, and an active operating state in which the drive belt (30, 50, 52) is rotated about the pulleys (34, 36, 54) so that a stop (26, 28, 60, 62, 64) moves longitudinally downstream in the engaged position, and in that, for each batch (Li) to be formed, the drive belt (30, 50, 52) is operated into its active state when a determined product, such as the first product (P1), is detected by a sensor (42), upstream of the phaser (22, 23).

4. The arrangement (10) as claimed in claim 3, characterized in that the phaser (23) comprises a first drive belt (50) and a second drive belt (52) that are similar and that are arranged in parallel and that are driven independently, and in that each drive belt (50, 52) is operated into its active state before the end of the active state of the other drive belt (50, 52), so that the make-up of a new batch (Li) begins before the preceding downstream batch (Li) has been released.

5. The arrangement (10) as claimed in claim 4, characterized in that, when the two drive belts (50, 52) are in the passive state, the standby positions of the stops (60, 62, 64) of the first drive belt (50) are offset relative to the standby positions of the stops (60, 62, 64) of the second drive belt (52), so as to prevent the stops (60, 62, 64) of the two drive belts (50, 52) from crossing.

6. The arrangement (10) as claimed in claim 5, characterized in that each drive belt (30, 50, 52) supports at least two similar stops (26, 28, 60, 62, 64) that are evenly spaced along the drive belt (30, 50, 52) so that, for each drive belt (30, 50, 52), only one stop (26, 28, 60, 62, 64) at a time can occupy an engaged position.

7. The arrangement (10) as claimed in claim 5, characterized in that the arrangement comprises a grouping device (24) with cavities (46) which is arranged at the exit (20) of the conveyor belt (12), each cavity (46) being provided to contain a batch (Li) of products (Pn, Pn+1) and to transport this batch (Li) to a downstream processing station.

8. The arrangement (10) as claimed in claim 3, characterized in that each drive belt (30, 50, 52) supports at least two similar stops (26, 28, 60, 62, 64) that are evenly spaced along the drive belt (30, 50, 52) so that, for each drive belt (30, 50, 52), only one stop (26, 28, 60, 62, 64) at a time can occupy an engaged position.

9. The arrangement (10) as claimed in claim 3, characterized in that the arrangement comprises a grouping device (24) with cavities (46) which is arranged at the exit (20) of the conveyor belt (12), each cavity (46) being provided to contain a batch (Li) of products (Pn, Pn+1) and to transport this batch (Li) to a downstream processing station.

10. The arrangement (10) as claimed in claim 3, characterized in that the arrangement comprises an ejection device (88) comprising means which are arranged upstream and/or downstream of the phaser (22, 23).

11. The arrangement (10) as claimed in claim 4, characterized in that each drive belt (30, 50, 52) supports at least two similar stops (26, 28, 60, 62, 64) that are evenly spaced along the drive belt (30, 50, 52) so that, for each drive belt (30, 50, 52), only one stop (26, 28, 60, 62, 64) at a time can occupy an engaged position.

12. The arrangement (10) as claimed in claim 4, characterized in that the arrangement comprises a grouping device (24) with cavities (46) which is arranged at the exit (20) of the conveyor belt (12), each cavity (46) being provided to contain a batch (Li) of products (Pn, Pn+1) and to transport this batch (Li) to a downstream processing station.

13. The arrangement (10) as claimed in claim 4, characterized in that the arrangement comprises an ejection device (88) comprising means which are arranged upstream and/or downstream of the phaser (22, 23).

14. The arrangement (10) as claimed in claim 2, characterized in that each drive belt (30, 50, 52) supports at least two similar stops (26, 28, 60, 62, 64) that are evenly spaced along the drive belt (30, 50, 52) so that, for each drive belt (30, 50, 52), only one stop (26, 28, 60, 62, 64) at a time can occupy an engaged position.

15. The arrangement (10) as claimed in claim 2, characterized in that the arrangement comprises a grouping device (24) with cavities (46) which is arranged at the exit (20) of the conveyor belt (12), each cavity (46) being provided to contain a batch (Li) of products (Pn, Pn+1) and to transport this batch (Li) to a downstream processing station.

16. The arrangement (10) as claimed in claim 2, characterized in that the arrangement comprises an ejection device (88) comprising means which are arranged upstream and/or downstream of the phaser (22, 23).

17. The arrangement (10) as claimed in claim 1, characterized in that each drive belt (30, 50, 52) supports at least two similar stops (26, 28, 60, 62, 64) that are evenly spaced along the drive belt (30, 50, 52) so that, for each drive belt (30, 50, 52), only one stop (26, 28, 60, 62, 64) at a time can occupy an engaged position.

18. The arrangement (10) as claimed in claim 17, characterized in that the arrangement comprises a grouping device (24) with cavities (46) which is arranged at the exit (20) of the conveyor belt (12), each cavity (46) being provided to contain a batch (Li) of products (Pn, Pn+1) and to transport this batch (Li) to a downstream processing station.

19. The arrangement (10) as claimed in claim 1, characterized in that the arrangement comprises a grouping device (24) with cavities (46) which is arranged at the exit (20) of the conveyor belt (12), each cavity (46) being provided to contain a batch (Li) of products (Pn, Pn+1) and to transport this batch (Li) to a downstream processing station.

20. The arrangement (10) as claimed in claim 1, characterized in that the arrangement comprises an ejection device (88) comprising means which are arranged upstream and/or downstream of the phaser (22, 23).

\* \* \* \* \*